United States Patent [19]

Mehrotra et al.

[11] Patent Number: 4,801,510
[45] Date of Patent: Jan. 31, 1989

[54] ALUMINA COATED SILCON CARBIDE WHISKER-ALUMINA COMPOSITION

[75] Inventors: Pankaj K. Mehrotra, Greensburg; Elizabeth R. Billman, Pittsburgh, both of Pa.

[73] Assignee: Kennametal Inc., Latrobe, Pa.

[21] Appl. No.: 92,113

[22] Filed: Sep. 2, 1987

[51] Int. Cl.$^4$ .................. C04B 41/87; C04B 35/80; C04B 35/84

[52] U.S. Cl. .................. 428/698; 428/699; 428/701

[58] Field of Search .............. 428/698, 699, 701, 408, 428/446

[56] References Cited

U.S. PATENT DOCUMENTS

| | | | |
|---|---|---|---|
| 4,485,179 | 11/1984 | Brennan et al. | 428/698 X |
| 4,532,182 | 7/1985 | Short et al. | 428/698 X |
| 4,589,900 | 5/1986 | Brennan et al. | 428/698 X |
| 4,652,413 | 3/1987 | Tiegs | 264/66 |
| 4,657,877 | 4/1987 | Becher et al. | 501/89 |

FOREIGN PATENT DOCUMENTS

| | | |
|---|---|---|
| 0208910 | 1/1987 | European Pat. Off. . |
| 0252046 | 1/1988 | European Pat. Off. . |
| 59-0078984 | 5/1984 | Japan . |
| 60-224778 | 11/1985 | Japan . |

OTHER PUBLICATIONS

"Multitoughening Ceramic," TECHNO Japan, vol. 19, No. 10, Oct. 1986.
"60 Year Old Grows Whiskers," Metal Powder Report, Jul. 1986.

Primary Examiner—Nancy A. B. Swisher
Attorney, Agent, or Firm—John J. Prizzi

[57] ABSTRACT

An article of manufacture is provided having a SiC whisker reinforced alumina matrix substrate which has an alumina coating bonded to its exterior surface. It has been found that these articles are useful as cutting inserts in the high speed rough machining of steels.

40 Claims, 1 Drawing Sheet

ALUMINA COATED SILCON CARBIDE WHISKER-ALUMINA COMPOSITION

BACKGROUND OF THE INVENTION

The present invention relates to coated composites containing silicon carbide whiskers distributed in an alumina based matrix, and which have an alumina coating thereon. It especially relates to metalcutting inserts made from such coated composites.

In the prior art, a variety of materials have been utilized for machining of ferrous and nonferrous metals. Among the prior art materials that have been utilized for the machining of steels have been both the coated and uncoated cemented carbides. Specific coated cemented carbides are described in U.S. Pat. No. 4,610,931 and are exemplified by the prior art commercial KC950 grade which is made in accordance with the foregoing patent (KC950 is a Trademark of Kennametal Inc. for its coated cutting inserts).

In addition, steels have also been machined utilizing TiC-TiN cermets such as those described in U.S. Pat. No. 3,971,656. Steels have also been commercially machined using ceramics such as alumina and alumina-titanium carbide ceramics. A prior art example of an alumina-titanium carbide cutting insert grade is the K090 grade, which contains about 30 volume percent titanium carbide (K090 is a Trademark of Kennametal Inc. for its alumina-titanium carbide cutting inserts).

While the foregoing compositions have been successful in machining steels, the cemented carbides are commercialy utilized under a combination of high feeds and low speeds, whereas the ceramic grades are utilized under a combination of high speeds and low feeds. We are not aware of any commercially available cutting tool grade which has been commercially utilized to machine steel at a combination of high speeds and high feeds.

Cutting inserts made of alumina-silicon carbide whisker composites (see U.S. Pat. No. 4,543,345) have been developed. These inserts, while commercially useful in the machining of nickel base superalloys, have not been practically applied to the machining of steels due to the poor tool lifetimes obtained. It is believed that these poor tool lifetimes are due to a strong chemical reaction which occurs between the iron in the steel and the silicon carbide in the cutting insert at the high temperatures produced at the cutting edge during machining.

The prior art commercial grades of alumina-silicon carbide whisker composites utilized in the machining of nickel base alloys have contained between 30 to about 36 v/o silicon carbide whiskers, since it has been found that machining performance is optimized in this composition range. Maximum fracture toughness is also achieved at this level of SiC whiskers.

SUMMARY OF THE INVENTION

Applicants have now surprisingly found that, by applying an alumina coating to substrates containing alumina and certain specific levels of SiC whiskers, a cutting tool can be produced which not only allows alumina-SiC whisker composites to be practically applied to the machining of steels, but also allows these materials to be useful in the high speed rough machining of steels at combinations of high feeds and high speeds.

In accordance with the present invention, an article of manufacture is provided having a substrate composed of SiC whiskers distributed in an alumina based matrix (matrix contains at least 50 v/o alumina) with an alumina coating bonded to the substrate. The substrate contains at least 5, and less than 30, v/o (volume percent) silicon carbide whiskers and less than about 95, and preferably more than 70, v/o alumina. Preferably, the article of manufacture is a cutting insert composed of the foregoing and having a cutting edge formed at the juncture of its rake and flank surfaces. Depending upon the machining application, the SiC whisker content is preferably at least about 5, to less than about 20, v/o and more preferably between about 10 and 18 v/o for soft steels, or preferably 20 to less than 30 v/o, and more preferably, between about 22 to 28 v/o for harder steels.

The alumina coating preferably has a thickness of between about 1.5 to about 10 microns, and more preferably between about 3 to about 7 microns. While the alumina coating may be directly bonded to the substrate, intermediate coatings may be applied between the substrate and the alumina to bond the alumina coating to the substrate. In one embodiment, a TiN coating may be bonded to the exterior of the alumina coating.

BRIEF DESCRIPTION OF THE DRAWINGS

The present invention and its advantages will become more apparent upon review of the following detailed description of the invention in conjunction with the drawings in which.

DETAILED DESCRIPTION OF THE INVENTION

Figure 1:
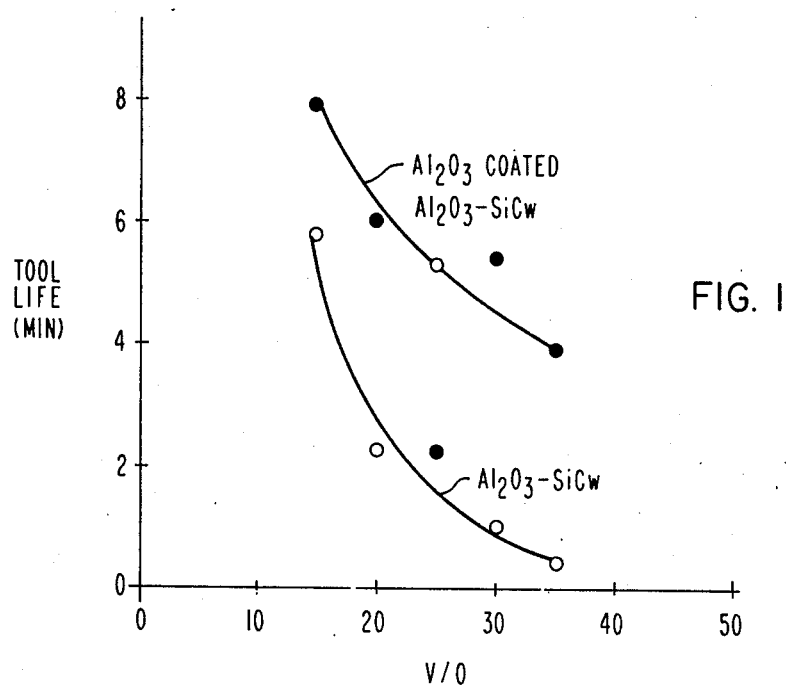
FIG. 1 is a graph of cutting tool lifetime during the turning of AISI 1045 steel as a function of SiC whisker ($SiC_w$) content in volume percent (v/o).

The applicants have found that by coating specific SiC whisker-alumina substrate compositions with an alumina coating, cutting inserts may be produced which have significantly enhanced tool lifetimes during the high speed rough machining of steels compared to the cutting performance of the uncoated substrate. Surprisingly, the best tool lifetime performances have been achieved in substrate compositions having a lower SiC whisker content than that used in the prior art commercial grades of SiC whisker-reinforced uncoated cutting inserts utilized for machining nickel base alloys. As previously mentioned, these prior art compositions contained 30 to about 36 v/o SiC whiskers distributed in an alumina matrix. This level of whisker content also maximized the fracture toughness of the material.

In accordance with the present invention, however, the SiC whisker content of the substrate is limited to more than 5 v/o, and less than 30 v/o, a composition range that should have reduced fracture toughness compared to the prior art commercial cutting insert composition. In fact, it has been found that for soft steels, such as AISI 1045 steel, the SiC whisker content of the substrate should be at least about 5, to less than about 20, v/o.

While not wishing to be bound by theory, the applicants believe that the advantageous and unexpected results obtained by the present invention can be explained by the following theory:

It is submitted that to maximize tool lifetimes in the high speed rough machining of steel a balance should be struck between the fracture toughness and the chemical reactivity of the substrate containing SiC whiskers distributed in an alumina matrix. While fracture toughness of these materials increases to a maximum in the range of 30 to 36 v/o SiC whiskers, the chemical reactivity of the substrate while machining steel is believed to increase as the SiC whisker content is increased. While in the present invention the substrate has been coated with an alumina coating to protect the substrate from contact with the steel, during use the alumina coating is worn away, placing the substrate in direct pressurized contact with the hot steel chips moving at high speeds across its rake face. In this condition, it is believed that the greater the SiC whisker content, the greater will be the reactivity of the substrate, and the higher the probability of an early tool failure due to crack propagation. It is, therefore, theorized that a balance must be struck between the reactivity and the fracture toughness of the substrate under the alumina coating in order to maximize tool lifetime. It is further theorized that the SiC whisker content at which this balance occurs shifts in accordance with the composition and hardness of the steel. For example, we believed that softer steels, such as low and medium carbon steels, have a higher reactivity with the SiC whiskers than harder steels. In addition it is believed that the fracture toughness of the insert need not be as high when turning soft material. Thus, the optimum cutting tool lifetime when high speed rough machining low or medium carbon steel is achieved with a lower SiC whisker content.

The invention will now be further clarified by a consideration of the following examples which are intended to be purely exemplary of the invention.

Approximately 725 to 750 grams of the mix compositions 1 through 5 shown in Table I were prepared by first deagglomerating SiC whiskers (0.3–0.7 micron diameter by 20 to 50 micron length) by ultrasonic vibration for about one-half hour and then adding the appropriate amounts of high purity alumina, 3.2–3.5 liters of isopropyl alcohol and 2.3 kilograms of one-fourth inch alumina cycloids. These materials were thoroughly, but gently, mixed in a mill jar for about one hour to produce a substantially homogeneous distribution of the SiC whiskers in the alumina while not causing excessive break-up of the SiC whiskers. The high purity alumina (ALCOA grade A16SG) had been previously milled to obtain an average size of about 0.5 to 0.6 microns. After mixing, the powder mixes were dried, and passed through a 100 mesh screen to remove any large agglomerates. Powder from each mix was then hot pressed in a 1.75 inch diameter graphite die at 1800° C. for one hour under a pressure of 4000 psi to produce substantially fully dense (i.e., at least 98% theoretical density) billets without noticeable degradation of whisker morphology. A protective atmosphere of argon was maintained throughout the hot-pressing at about one atmosphere.

The hot pressed billets were cut and ground to SNG-453T style cutting inserts. The T stands for K land or chamfer. In the present inserts, the chamfer utilized had a projected width of 0.008 inches in the plane of the rake surface and declined at an angle of 20° from the plane of the rake surface as it extended toward the cutting edge and flank face. Some inserts of each composition were then coated with a 3–5 micron thick alumina coating applied and bonded to the insert substrate by conventional chemical vapor deposition techniques at about 950° C.

TABLE I

MIX COMPOSITIONS

| Mix No. | Nominal Composition | |
|---|---|---|
| | SiC Whisker v/o | $Al_2O_3$ v/o |
| 1 | 15 | 85 |
| 2 | 20 | 80 |
| 3 | 25 | 75 |
| 4 | 30 | 70 |
| 5 | 35 | 65 |

Cutting inserts (in both coated and uncoated conditions) representing each mix were then used in the high speed rough turning of AISI 1045 and 4340 steel under the machining conditions and with the results shown in Tables II and III.

TABLE II

High Speed Roughing of AISI 1045 Steel

| Cutting Insert Material Mix No. | Insert Life (Minutes) | Average | Failure Mode |
|---|---|---|---|
| 1 | 6.6[1], 5.0[2] | 5.8 | DOCN, CH |
| 2 | <.5, 4.0 | 2.25 | DOCN, BK |
| 3 | 9.5, 1.0 | 5.25 | CH, CR-BK |
| 4 | .6, 1.4 | 1.0 | CR, BK |
| 5 | <.5, 0.3 | .4 | CR, BK |
| 1 coated | 8.8, 7.0 | 7.9 | DOCN, BK |
| 2 coated | 4.0, 8.0 | 6.0 | CH, DOCN |
| 3 coated | 4.0, 0.5 | 2.25 | CH, BK |
| 4 coated | 4.8, 6.0 | 5.4 | DOCN, FW(CH) |
| 5 coated | 3.8, 4.0 | 3.9 | DOCN, DOCN(CH) |

[1]The first column of insert lifetimes was determined by turning 1045 steel having Brinell hardnesses of 192 to 202 at 1000 surface feet/minute, 0.025 inch/revolution feed, and 0.1 inch depth of cut.

[2]The second column of insert lifetimes was determined under conditions identical to those used to obtain the first column of lifetimes except that a different lathe and an 0.024 inch/revolution feed rate were utilized.

DOCN = Depth of Cut Notch: criterion ≧0.03"
CH = Chipping: criterion ≧0.03"
BK = Breakage
CR = Crater wear: criterion ≧0.004"
FW = Flank wear: criterion ≧0.015"

TABLE III

High Speed Roughing of AISI 4340 Steel

| Cutting Insert Material Mix No. | Insert[1] Life (Minutes) | Failure Mode |
|---|---|---|
| 1 | 1 | CH |
| 2 | 0.7 | BK |
| 3 | 0.5 | BK |
| 4 | 0.4 | BK |
| 5 | 0.25 | BK |
| 1 coated | 0.7 | CH |
| 2 coated | 0.5 | BK |
| 3 coated | 8.25 | Corner BK |
| 4 coated | 2.5 | BK |
| 5 coated | 1.75 | BK |

[1]Uncoated inserts were tested under the conditions described in Footnote 1 and coated inserts were tested under the conditions described under Footnote 2 of TABLE II, except that the work material used was AISI 4340 having a Brinell hardness of 295.

Figure 2:
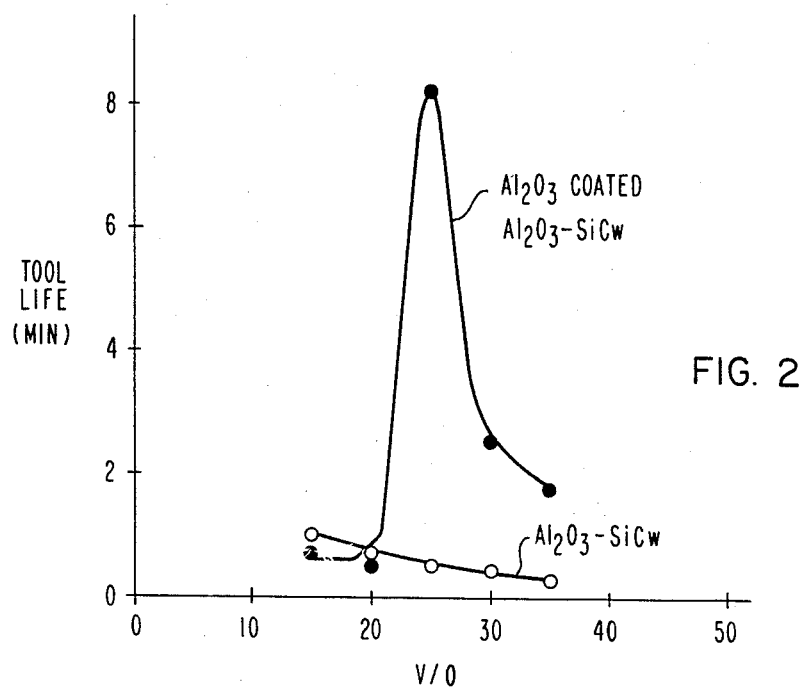
FIG. 2 is a graph of cutting tool lifetime during the turning of AISI 4340 steel as a function of SiC whisker content.

As can be seen from the foregoing tables and FIGS. 1 and 2, which summarize the cutting tool lifetime results as a function of SiC whisker content, significant and unexpected improvements in cutting tool life are achieved by alumina coating specific compositions of SiC whisker reinforced-alumina cutting inserts. For the 1045 steel, which is a relatively soft material (Brinell Hardness No. 192-202) the highest cutting tool lifetimes were achieved in alumina coated inserts having a Mix No. 1 substrate (15 v/o SiC whiskers). As the SiC whisker content is increased, the lifetime is decreased. This is believed to be due to the increased reactivity of the substrate with the steel. While no tests were performed at SiC whisker contents below 15 v/o, it is believed that substrates containing less than 5 v/o SiC whisker content would not have the fracture toughness required to machine this material. It is, therefore, our belief that for machining medium carbon steels such as 1045 the SiC whisker content of the substrate should preferably be between about 5 and 20 v/o, and more preferably, 10 to 18 volume percent to achieve maximum tool lifetimes during high speed roughing.

For the 4340 steel, which typically has a hardness of 295 BHN, cutting tool lifetimes in the alumina coated materials tested were maximized at about 25 v/o SiC whisker content (Mix No. 3). As the SiC whisker content was increased to 30 and 35 v/o, significant reductions in cutting tool lifetime were observed. These reductions in lifetimes are believed to be due to the increased reactivity of the substrate. As the SiC whisker content is decreased to 20 and 15 v/o, cutting tool lifetime again drops significantly. These reductions, however, are believed to be due to the reduction in fracture toughness caused by the lower SiC whisker content. It is, therefore, our belief that, for machining low alloy steels, such as 4340, the SiC whisker content of the substrate is preferably less than 30, and more than 20, v/o, and more preferably, less than 28, and more than 22, v/o to achieve maximum tool lifetimes during high speed roughing.

It is now clear that in the range of 5, to less than 30, v/o SiC whiskers, a series of alumina coated grades can be developed designed for the high speed roughing of a variety of steels, such as the low carbon, medium carbon, high carbon, low alloy and stainless steels. The specific substrate composition required would depend on the reactivity of the substrate with the steel and the hardness or strength of the steel.

It is believed that acceptable results will be achieved with alumina coating thicknesses in the range of 1.5 to 10 microns, and more preferably, 3 to 7 microns. It is expected that further improvements in lifetime can be achieved if a TiN coating is applied over and bonded to the alumina coating. It is presently contemplated that the TiN coating may be applied directly to the alumina coating or may be bonded to alumina coating via an intermediate coating of TiCN, for example. It is well known in the art that TiN coatings have a lower coefficient of friction than alumina coatings. If a TiN coating is applied, it should preferably have a thickness in the range of about 0.5 to 10 microns, and more preferably, 0.5 to 5 microns.

In addition, it is believed that an intermediate coating may be applied between the alumina coating and the substrate to improve the adhesion of the alumina coating. It is presently contemplated that this intermediate coating may be a titanium carbide, titanium nitride or titanium carbonitride coating.

In addition, it is contemplated that a sintering aid may be added to improve the sinterability of these materials. It is presently contemplated that zirconia, magnesia, and/or a rare earth oxide, such as yttria, may be utilized in minor amounts of about 2 v/o or less total. Zirconia, however, may be added in greater amounts, not exceeding 20 v/o of the substrate, to further improve the fracture toughness of the substrate.

It is further believed that the manufacturing cost of the present invention may be reduced if the hot pressing step utilized herein to at least substantially fully densify the substrate is replaced by the densification method described in P. K. Mehrotra et al. copending U.S. patent application Ser. No. 092,118, filed concurrently with the present application. In application Ser. No. 092,118, the whisker containing ceramic substrate is sintered to substantially full density by a method including the steps of: (a) forming a compact of a sinterable ceramic composition; (b) applying a coating to the compact by vapor deposition of a ceramic composition that does not become vitreous before or during the subsequent isostatic pressing step; and (c) heating and isostatically pressing the coated compacts in an atmosphere that reacts with the coating and/or the compact at pressing temperatures and pressures to cause the compact to approach theoretical density. This application Ser. No. 092,118 and all other applications and patents referred to herein are hereby incorporated by reference.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A coated composite comprising:
   a substrate comprising at least 5, and less than 30, volume percent silicon carbide whiskers;
   and less than about 95, and more than 70, volume percent alumina;
   and an alumina coating bonded to said substrate.

2. The coated composite according to claim 1 wherein said SiC whiskers comprise at least 5 to less than about 20 volume percent of said substrate.

3. The coated composite according to claim 2 wherein said alumina coating has a thickness between about 1.5 to about 10 microns.

4. The coated composite according to claim 2 wherein said alumina coating has a thickness between about 3 to about 7 microns.

5. The coated composite according to claim 2 wherein said substrate further comprises a sintering aid.

6. The coated composite according to claim 2 wherein said substrate further comprises zirconia in an amount greater than about 2 volume percent, but not exceeding 20 volume percent of said substrate.

7. The coated composite according to claim 1 wherein said SiC whiskers comprise 20 to less than 30 volume percent of said substrate.

8. The coated composite according to claim 7 wherein said alumina coating has a thickness between about 1.5 to about 10 microns.

9. The coated composite according to claim 7 wherein said alumina coating has a thickness between about 3 to about 7 microns.

10. The coated composite according to claim 7 wherein said substrate further comprises a sintering aid.

11. The coated composite according to claim 7 wherein said substrate further comprises zirconia in an amount greater than about 2 volume percent, but not exceeding 20 volume percent of said substrate.

12. The coated composite according to claim 1 wherein said alumina coating has a thickness between about 1.5 to about 10 microns.

13. The coated composite according to claim 1 wherein said alumina coating has a thickness between about 3 to about 7 microns.

14. A cutting insert comprising:
a cutting edge formed at a juncture of a rake surface and a flank surface of said cutting insert;
said cutting insert having a substrate and an alumina coating bonded to said substrate, said substrate composed of more than 5, and less than 30, volume percent silicon carbide whiskers, and less than 95, and more than 70, volume percent alumina.

15. The cutting insert according to claim 14 wherein said SiC whiskers comprise at least 5 to less than about 20 volume percent of said substrate.

16. The cutting insert according to claim 15 wherein said alumina coating has a thickness between about 1.5 to about 10 microns.

17. The cutting insert according to claim 15 wherein said alumina coating has a thickness between about 3 to about 7 microns.

18. The cutting insert according to claim 15 wherein said substrate is further composed of a sintering aid.

19. The cutting insert according to claim 15 wherein said substrate is further composed of zirconia in an amount greater than about 2 volume percent, but not exceeding 20 volume percent of said substrate.

20. The cutting insert according to claim 14 wherein said SiC whiskers comprise 20 to less than 30 volume percent of said substrate.

21. The cutting insert according to claim 20 wherein said alumina coating has a thickness between about 1.5 to about 10 microns.

22. The cutting insert according to claim 20 wherein said alumina coating has a thickness between about 3 to about 7 microns.

23. The cutting insert according to claim 20 wherein said substrate is further composed of a sintering aid.

24. The cutting insert according to claim 20 wherein said substrate is further composed of zirconia in an amount greater than about 2 volume percent, but not exceeding 20 volume percent of said substrate.

25. The cutting insert according to claim 14 wherein said alumina coating has a thickness between about 1.5 to about 10 microns.

26. The cutting insert according to claim 14 wherein said alumina coating has a thickness between about 3 to about 7 microns.

27. The cutting insert according to claim 14 wherein said SiC whiskers comprise between about 22 and 28 volume percent of said substrate.

28. The cutting insert according to claim 14 wherein said SiC whiskers comprise between about 10 and 18 volume percent of said substrate.

29. The cutting insert according to claim 14 further comprising a TiN coating bonded over said alumina coating.

30. A cutting insert comprising:
a cutting edge formed at the juncture of a rake surface and a flank surface of said cutting insert;
said cutting insert having a substrate and an alumina coating bonded to said substrate;
and said substrate containing more than 5, and less than 30, volume percent SiC whiskers distributed in an alumina based matrix.

31. The cutting insert according to claim 30 wherein said substrate further contains a sintering aid.

32. The cutting insert according to claim 30 wherein said substrate further contains zirconia in an amount greater than about 2 volume percent, but not exceeding 20 volume percent of said substrate.

33. The cutting insert according to claim 32 wherein said substrate contains more than 5, and less than about 20, volume percent silicon carbide whiskers.

34. The cutting insert according to claim 30 wherein said substrate contains more than 5, and less than about 20, volume percent silicon carbide whiskers.

35. A cutting insert comprising:
a cutting edge formed at the juncture of a rake surface and a flank surface of said cutting insert;
said cutting insert having a substrate and an alumina coating bonded to said substrate;
and said substrate composition consisting of more than 5, and less than 30, volume percent SiC whiskers distributed in an alumina matrix.

36. The cutting insert according to claim 35 wherein said substrate composition consists of more than 5, and less than 20, volume percent SiC whiskers distributed in said alumina matrix.

37. The cutting insert according to claim 36 wherein said substrate composition further consists of a sintering aid.

38. The cutting insert according to claim 36 wherein said substrate composition further consists of a zirconia in an amount greater than about 2 volume percent, but not exceeding 20 volume percent of said substrate composition.

39. The cutting insert according to claim 35 wherein said substrate composition further consists of a sintering aid.

40. The cutting insert according to claim 35 wherein said substrate composition further consists of a zirconia in an amount greater than about 2 volume percent, but not exceeding 20 volume percent of said substrate composition.

* * * * *

Adverse Decision in Interference

Patent No. 4,801,510, Pankaj K. Mehrotra, Elizabeth R. Billman, ALUMINA COATED SILICON CARBIDE WHISKER-ALUMINA COMPOSITION, Interference No. 102,712, final judgment adverse to the patentees rendered June 29, 2000, as to claims 1-40.

*(Official Gazette November 28, 2000)*